US011178204B1

(12) United States Patent
Nijim et al.

(10) Patent No.: US 11,178,204 B1
(45) Date of Patent: Nov. 16, 2021

(54) VIDEO PROCESSOR TO ENHANCE COLOR SPACE AND/OR BIT-DEPTH

(71) Applicant: Cox Communications, Inc., Atlanta, GA (US)

(72) Inventors: Yousef Wasef Nijim, Cumming, GA (US); James Alan Strothmann, Johns Creek, GA (US); Jay Paul Langa, Cumming, GA (US)

(73) Assignee: COX COMMUNICATIONS, INC., Atlanta, GA (US)

( * ) Notice: Subject to any disclaimer, the term of this patent is extended or adjusted under 35 U.S.C. 154(b) by 414 days.

(21) Appl. No.: 15/440,740

(22) Filed: Feb. 23, 2017

(51) Int. Cl.
*H04L 29/06* (2006.01)
*H04N 19/186* (2014.01)
(Continued)

(52) U.S. Cl.
CPC ........ *H04L 65/607* (2013.01); *H04L 65/4069* (2013.01); *H04L 65/602* (2013.01);
(Continued)

(58) Field of Classification Search
CPC ........... H04N 7/0125; H04N 21/43635; H04N 21/4402; H04N 21/816; H04N 19/44; H04N 19/46; H04N 21/2343; H04N 21/4345; H04N 21/84; H04N 21/234363; H04N 21/23439; H04N 21/2353; H04N 21/4728; H04N 21/4858; H04N 7/015; H04N 9/8722; H04N 19/33; H04N 21/44029; H04N 21/63; H04N 21/64322; H04N 17/04; H04N 19/186; H04N 19/187; H04N 19/70; H04N 19/98; H04N 21/234309;
(Continued)

(56) References Cited

U.S. PATENT DOCUMENTS 7,143,432 B1 * 11/2006 Brooks .......... H04N 21/234363
725/105
7,230,986 B2 * 6/2007 Wise .................... G06F 9/3867
375/240.26
(Continued)

OTHER PUBLICATIONS

Borg, Lars, "A better color matching between HD and UHD content", Written for presentation at the SMPTE 2014 Annual Technical Conference & Exhibition, 2014, 18 pages.
(Continued)

*Primary Examiner* — Kevin T Bates
*Assistant Examiner* — Ranjan Pant
(74) *Attorney, Agent, or Firm* — Merchant & Gould P.C.

(57) ABSTRACT

Aspects of the present disclosure provide video content having enhanced color spaces and/or bit-depths, but are not so limited. A system includes a video processor and video processing instructions to transform portions of a video content item from a first color space and/or bit-depth to a second color space and/or bit-depth. A method transforms portions of a video content item from a first color space and/or bit-depth to a second color space and/or bit-depth when delivering the video content item to a display device. A computer-readable storage medium or device stores executable instructions that transform portions of a video content item from a first color space and/or bit-depth to a second color space and/or bit-depth after receiving a request to display the video content item on a display device.

18 Claims, 9 Drawing Sheets

(51) Int. Cl.
*H04N 19/18* (2014.01)
*H04N 19/167* (2014.01)

(52) U.S. Cl.
CPC .......... *H04N 19/167* (2014.11); *H04N 19/18* (2014.11); *H04N 19/186* (2014.11)

(58) Field of Classification Search
CPC ... H04N 21/440245; H04N 21/440272; H04N 21/4516; H04N 21/47; H04N 7/01; H04N 7/0117; H04N 19/117; H04N 21/2387; H04N 21/2393; H04N 21/2665; H04N 21/4854; H04N 19/18; H04N 19/167; G06F 3/14; H04L 1/0075; H04L 1/0045; H04L 43/0811; H04L 12/18; H04L 27/2602; H04L 27/265; H04L 67/02; H04L 65/607; H04L 65/602; H04L 65/4069

See application file for complete search history.

(56) References Cited

U.S. PATENT DOCUMENTS

| | | | | |
|---|---|---|---|---|
| 8,600,159 | B2* | 12/2013 | Greenebaum | H04N 9/67 |
| | | | | 382/167 |
| 8,860,745 | B2 | 10/2014 | Le | |
| 9,414,095 | B1* | 8/2016 | Corda | H04L 63/0428 |
| 2003/0156652 | A1* | 8/2003 | Wise | G06F 9/3867 |
| | | | | 375/240.26 |
| 2008/0043832 | A1* | 2/2008 | Barkley | H04N 21/234327 |
| | | | | 375/240 |
| 2009/0097561 | A1* | 4/2009 | Chiu | H04N 19/30 |
| | | | | 375/240.16 |
| 2009/0161768 | A1* | 6/2009 | Park | H04N 19/172 |
| | | | | 375/240.24 |
| 2009/0285283 | A1* | 11/2009 | Gao | G06T 5/009 |
| | | | | 375/240.08 |
| 2010/0008427 | A1 | 1/2010 | Chiu et al. | |
| 2010/0104181 | A1* | 4/2010 | Lin | G03B 23/00 |
| | | | | 382/167 |
| 2010/0302439 | A1* | 12/2010 | Le | H04N 9/67 |
| | | | | 348/453 |
| 2012/0155550 | A1* | 6/2012 | Wu | H04N 7/0142 |
| | | | | 375/240.25 |
| 2012/0236205 | A1* | 9/2012 | Lee | H04N 9/67 |
| | | | | 348/708 |
| 2013/0038790 | A1* | 2/2013 | Seetzen | G09G 5/02 |
| | | | | 348/453 |
| 2014/0003527 | A1* | 1/2014 | Tourapis | H04N 19/147 |
| | | | | 375/240.16 |
| 2014/0082054 | A1* | 3/2014 | Denoual | H04N 21/85406 |
| | | | | 709/203 |
| 2014/0146229 | A1* | 5/2014 | Hsiao | H04N 5/44591 |
| | | | | 348/441 |
| 2015/0103902 | A1* | 4/2015 | Li | H04N 19/30 |
| | | | | 375/240.12 |
| 2015/0109326 | A1* | 4/2015 | Romano | G06F 3/14 |
| | | | | 345/618 |
| 2015/0172670 | A1* | 6/2015 | Li | H04N 19/136 |
| | | | | 375/240.08 |
| 2015/0249848 | A1* | 9/2015 | Holman | H04N 21/23439 |
| | | | | 348/469 |
| 2015/0304693 | A1* | 10/2015 | Hwang | H04N 21/2662 |
| | | | | 725/116 |
| 2015/0326923 | A1* | 11/2015 | Chung | H04N 21/2362 |
| | | | | 725/110 |
| 2016/0057494 | A1* | 2/2016 | Hwang | H04N 21/4126 |
| | | | | 725/133 |
| 2016/0300341 | A1* | 10/2016 | Hay | G06F 16/7335 |
| 2016/0371818 | A1* | 12/2016 | Su | G06T 3/4007 |
| 2017/0134731 | A1* | 5/2017 | Tourapis | H04N 1/646 |
| 2017/0142424 | A1* | 5/2017 | Jun | H04N 19/184 |
| 2017/0324797 | A1* | 11/2017 | Lee | H04N 21/236 |

OTHER PUBLICATIONS

Aminlou, et al., "Weighted-prediction-based color gamut scalability extension for the H.265/HEVC video codec", In Proceedings of the 2014 IEEE International Conference on Acoustic, Speech and Signal Processing (ICASSP), Apr. 2014, 5 pages.

"Colour conversion from Recommendation ITU-R BE.709 to Recommendation ITU-R BT.2020", International Telecommunication Union, ITU-R Radiocommunication Sector of ITU, Published Oct. 2015, 11 pages. Available at http://www.itu.int/publ/R-REC/en.

* cited by examiner

VIDEO PROCESSOR TO ENHANCE COLOR SPACE AND/OR BIT-DEPTH

BACKGROUND

With the rapid improvements in graphics and other digital hardware processing capabilities, video display devices are quickly outpacing the available video delivery methods. The International Telecommunication Union (ITU) Radiocommunication Sector publishes standards for use in radiocommunication systems, such as display resolutions, frame rates, bit-depths, and color spaces as a few examples. Such standards may be or often are referred to as "ITU-R Recommendation BT", "Rec." or "BT." Earlier standards, such as Rec. 601 and Rec. 709, continue to be used to deliver video. However, hardware and software improvements in display technology have enabled use of Rec. 2020 standards (e.g., 4K or ultra-high definition (UHD) display capability).

Consumers are now able to purchase UHD capable televisions, projectors, tablets, laptops, and smartphones. However, consumers having display devices that include 4K or UHD display capability may be receiving a less than optimal video signal and not utilizing the improved capability of a particular display device. For example, a content provider may provide content that conforms to Rec. 709, but an end-user has a Rec. 2020 capable digital television. The technical problems associated with converting from Rec. 709 to Rec. 2020 are neither trivial nor straightforward and, depending on the conversion methodology, may affect picture quality, bandwidth usage, signal quality, etc.

SUMMARY

Aspects of the present disclosure provide video content having enhanced color spaces and/or bit-depths, but are not so limited. A system of an embodiment includes a video processor and video processing instructions to transform portions of a video content item from a first color space and/or bit-depth to a second color space and/or bit-depth. A method of an embodiment transforms portions of a video content item from a first color space and/or bit-depth to a second color space and/or bit-depth when delivering the video content item to a display device. A computer-readable storage medium or device of an embodiment stores executable instructions that transform portions of a video content item from a first color space and/or bit-depth to a second color space and/or bit-depth after receiving a request to display the video content item on a display device. Other embodiments and implementations are available according to the following details.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the present disclosure.

BRIEF DESCRIPTION OF THE DRAWINGS

Further features, aspects, and advantages of the present disclosure will become better understood by reference to the following figures, wherein like reference numbers indicate like elements throughout the several views.

DETAILED DESCRIPTION

Figure 1:
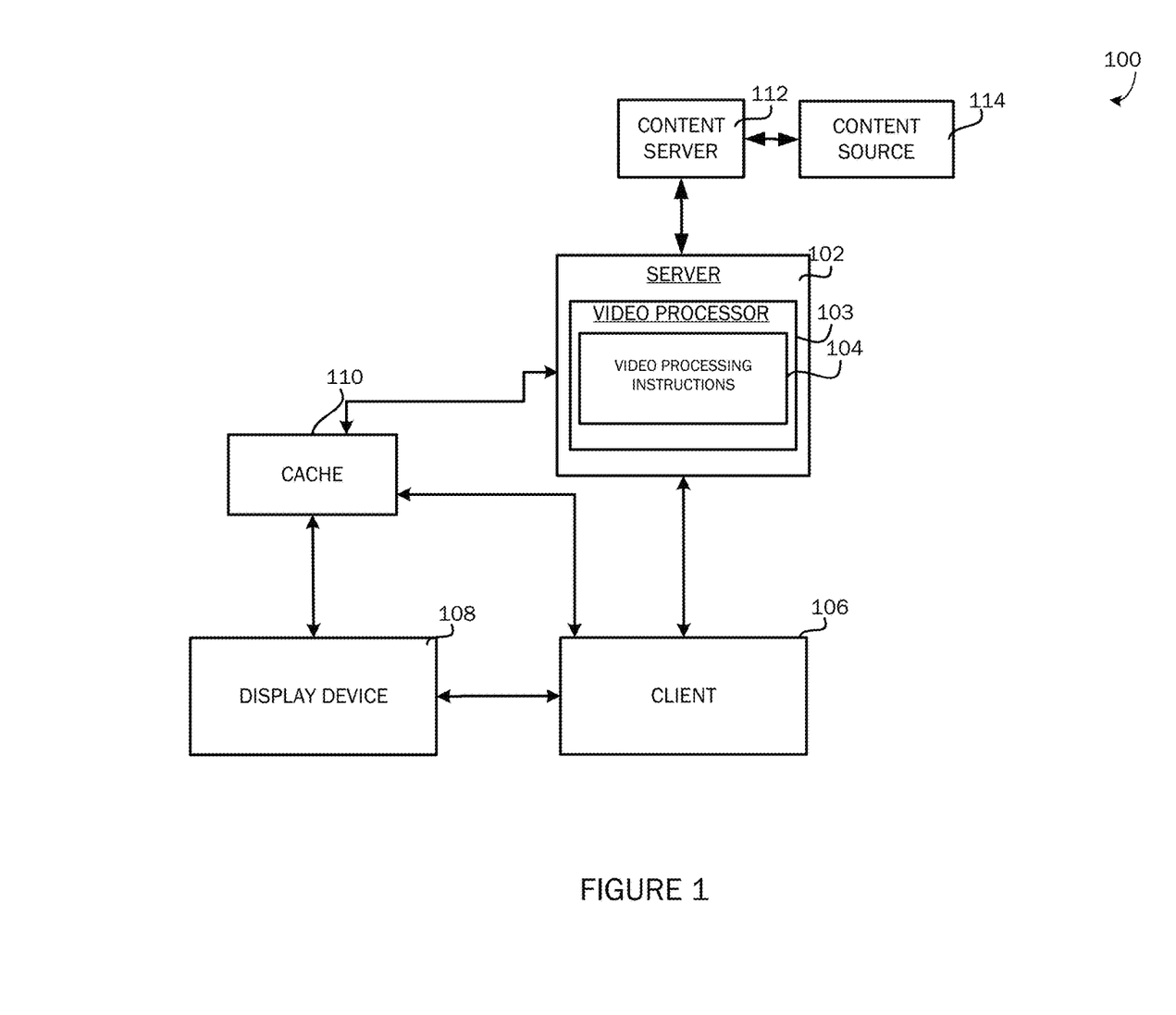
FIG. 1 is a block diagram that depicts a high-level overview of a system to provide video content having enhanced color spaces and/or bit-depths in accordance with an embodiment.

FIG. 1 is a block diagram that depicts a high-level overview of a system 100 to provide video content having enhanced color spaces and/or bit-depths, but is not so limited. System 100 of one embodiment provides content items via a hybrid fiber coax (HFC) network (see FIG. 6). As shown in FIG. 1, the system 100 includes a server computer 102 that includes a video processor 103 and a video processing instructions 104 as part of providing video content to client 106. According to an embodiment, server computer 102 can utilize video processing instructions 104 to transform a video content item of a first type/format to a second type/format as part of providing the video content item to a display device 108 or other component associated with client 106. For example, server computer 102 can utilize video processing instructions 104 to up-sample a recorded video content item or live event from a Rec. 709 color space to a Rec. 2020 color space (or down-sample from Rec. 2020 to Rec. 709) as part of providing a video content item (e.g., live events, video recordings, etc.) to a display device 108.

According to an embodiment, video processing instructions 104 can utilize region of interest (ROI) features or parameters to process video content items using a predictive model and/or a look-up table. As described further below, ROI features can be used to determine which portion or portions of a video frame will be transformed into a new color space and/or bit-depth to thereby enhance use of available bandwidth amounts and/or processing and memory resources required to transform video content. As an example, certain frame blocks or frame portions may be identified for transforming to a Rec. 2020 color space and a 10-bit format to thereby require less processing and memory resources as compared to transforming or converting an entire video frame. It will be appreciated that each color component (e.g., luminance (Y) and chrominance (Cb and Cr)) can be stored and distributed using a number of bits per pixel including high-precision (e.g., 16-bit) floating-point formats.

Transformed video content can include video signals, video bit streams, video files, etc., and metadata used by client 106 to decode a transformed signal to utilize the full capability of display device 108. Server 102 of an embodiment can use the video processing instructions 104 to generate metadata when processing one or more ROIs of each frame. Metadata may include lookup table mapping values to transform from a first color space to a second color space, mapping coefficients to transform from a first color space to a second color space, mapping function parameters to transform from a first color space to a second color space, etc. It will be appreciated that some portion of the operations associated with the video processing instructions 104 may be distributed among various components of system 100. For example, high-performance back-end components may be used to perform more demanding video processing operations while less demanding video processing operations can be executed at display device 108 or some other client-side component.

Depending on capabilities of each particular display device 108 (e.g., projector, television, tablet, smartphone, etc.), video processing instructions 104 can be tailored to provide video content items in a format best suited (e.g., transformed to a higher or lower fidelity) for the corresponding display capabilities. It will be appreciated that each type of display device 108 can include one or more chips or chipsets that provide digital processing capability (e.g., see Microprocessor without Interlocked Pipeline Stages (MIPS) having a reduced instruction set computer (RISC) instruction set architecture (ISA)). Client 106 of one embodiment operates to display a user interface (UI) that provides users with options to identify if a display device 108 is capable of displaying UHD. Client 106 of one embodiment can use an HDMI or other interface to discover display capabilities to determine when to apply ROI analysis and/or color transformations for one or more ROIs. Client 106 can be configured to display a message to a user to identify display capabilities when: setting of account/user preferences, connecting a device display, STB, DVR, or other component for the first time, when using a universal remote control, etc., to either update or confirm display setting or cancel the message.

Client 106 and/or cache 110 can be integrated with various devices, such as set-top boxes (STBs), digital video recorders (DVRs), gaming devices, gateway devices, etc. and used with various video encoders (e.g., MPEG-2, MPEG-4, part 2, H.264, HEVC, Google's VP8, Microsoft's VC-1, etc.). Cache 110 can be used to store aspects of the video content item including pixel data and/or prediction data for each frame including one or more ROI pixels and/or non-ROI pixels. In one embodiment, the cache 110 stores pixel data for ROIs associated with a current frame and ROIs associated with one or more previous frames. It will be appreciated that in some cases an ROI may encompass all or some majority portion of a video frame.

As part of providing a color and/or bit-depth transformation for DVR or VOD content, the system 100 of one embodiment: identifies a video profile associated with the video content item (e.g., if 4:2:0 YCrCb, then up-sample to 4:4:4 YCrCb) before converting to an RGB format, converts from YUV or RGB format into the XYZ color format, up-samples using adaptive linear prediction to determine prediction coefficients for mapping pixels from a first color space to a second color space, provides the prediction coefficients with the metadata to the display device 108 or other component, maps ROI pixels from a first color space to a second color space, and/or applies 10 bits for each new value of the second color space.

For linear content, the system 100 of one embodiment: determines second order difference equation coefficients, applies adaptive linear prediction based on one or more prior frames of the linear content items, and passes coefficients to an STB, display device 108, or other component. The system 100 can alternatively apply mapping parameters of a look-up table to transform the content items into a new color space by mapping each color of a first color space to a new color space. Look-up table mappings can be stored in various locations such as cache 110, an STB, a DVR, in the cloud, back-office, or other location. After converting to RGB format and then YCrCb, look-up table mappings can be used to map values from the first color space to the new color space followed by applying 10 bits for each new value of the new color space.

Content server 112 may include source video content data and/or metadata available via a service provider, such as cable television (CATV) services system (as illustrated and described below with reference to FIG. 6), satellite television provider, etc. The data and/or metadata may include information such as video content titles, storylines, casts, genres, ratings, release dates, images, prediction coefficients, prediction formulas, look-up table data, etc. A content source 114 can include linear and/or non-linear content available to consumers/users via a service provider or other source, but is not so limited. For example, the broadcasts of television programs carried via the content server 112, which may be temporarily spooled on computer-readable storage media or directly transmitted over the physical network, from television networks are included as content sources. As will be appreciated, content that is described as "broadcast" will include content that is unicast (e.g., from a source to a caching location, between caching locations, and from a caching location to a consumer) as linear content.

Computers, devices, and associated hardware used in the providing of content include processors and memory storage devices, which store instructions that when executed by the processors enable color transformations from a first color space to a second color space along with bit-depth adjustments. Memory storage devices are articles of manufacture that include computer-readable storage media. The term computer-readable storage media does not include transmission media, but refers to hardware media used to store desired information for access by a computer or processor. Examples of computer-readable storage media include, but are not limited to, RAM, ROM, EPROM, EEPROM, solid state memory, such as flash memory, optical storage, such as CD-ROMs and DVDs, and magnetic storage devices, such as magnetic tape and magnetic disks.

Figure 2:
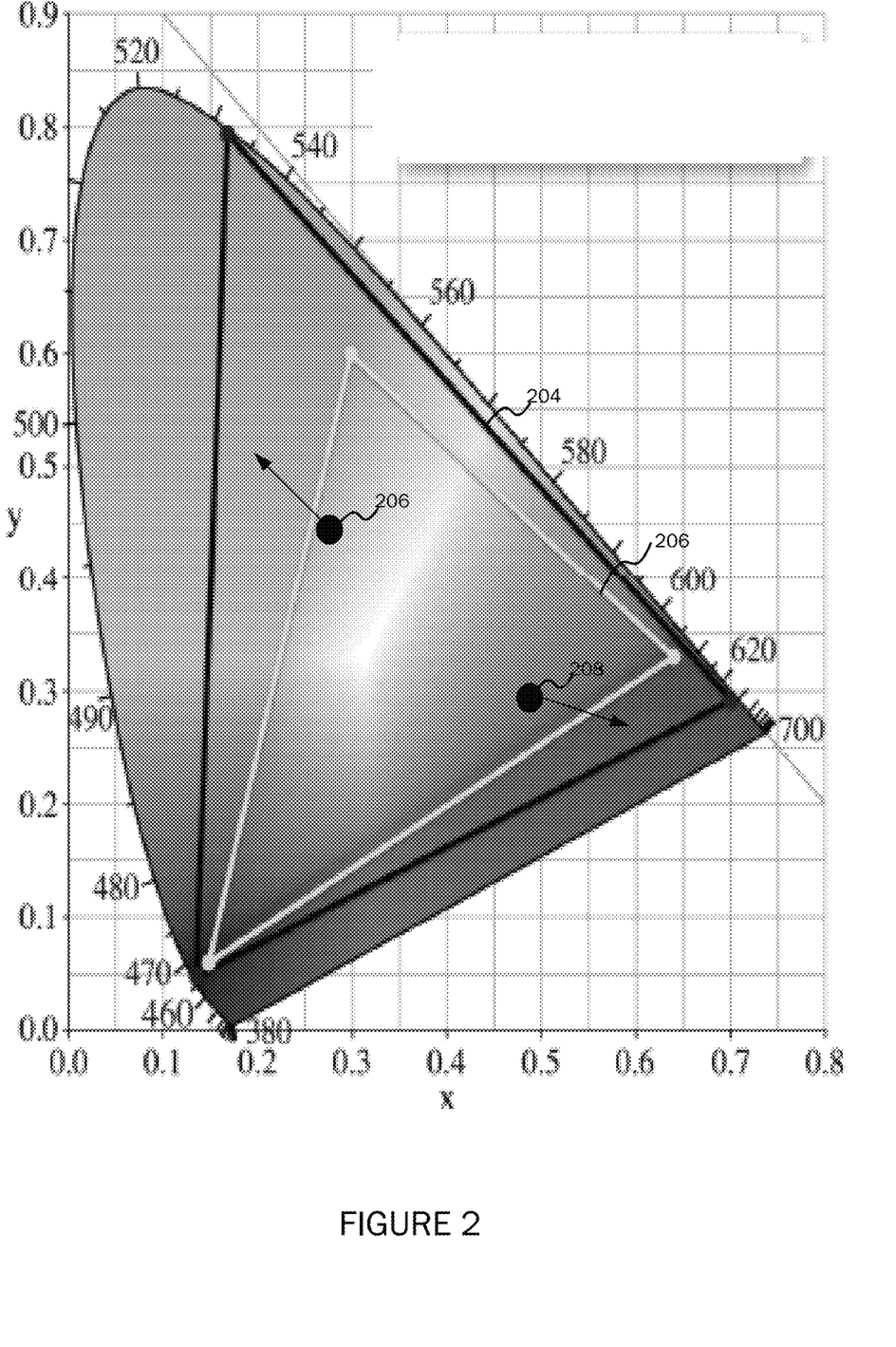
FIG. 2 is a diagram that depicts a composite color space that includes the Rec. 709 color space and the Rec. 2020 color space.

FIG. 2 is a diagram that depicts a composite color space that includes the Rec. 709 color space (encompassed by line 202) and the Rec. 2020 color space (encompassed by line 204). As described herein, video content can be transformed by mapping or transforming pixels from the Rec. 709 color space to the Rec. 2020 color space (and vice versa).

Figure 3:
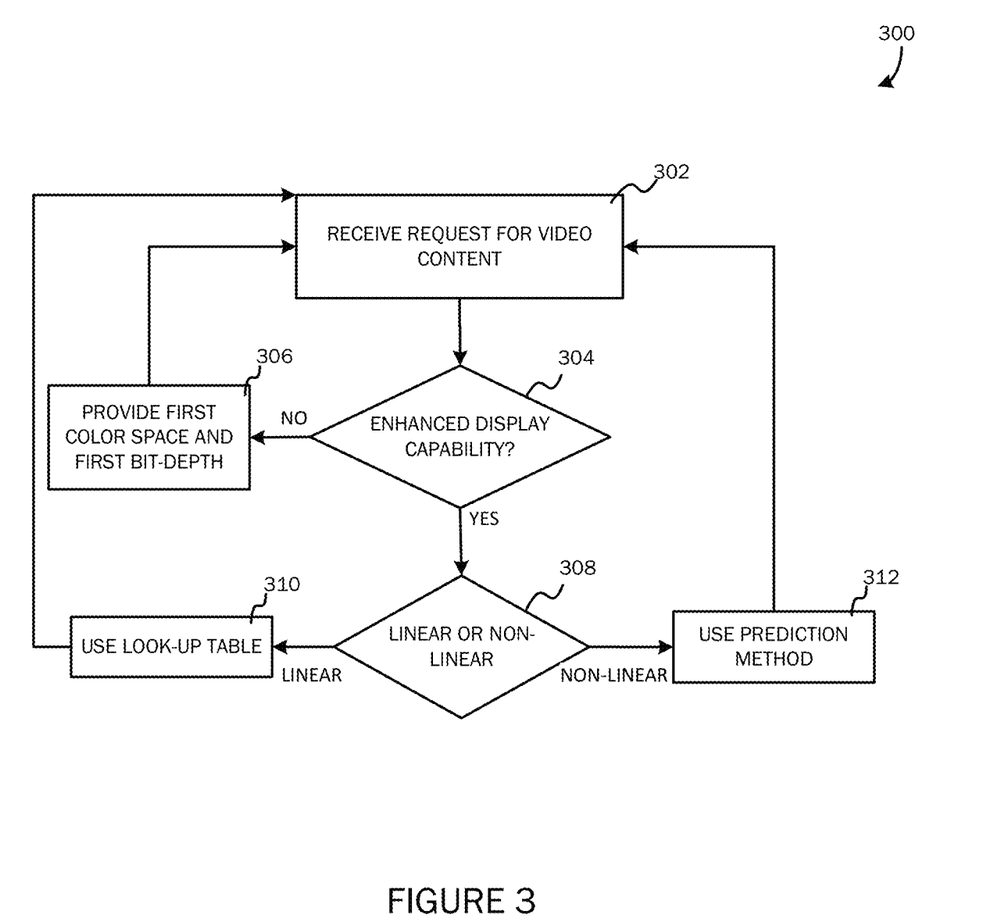
FIG. 3 is a flow diagram that depicts a process of using color space transformation techniques to transform or map pixel parameters from a first color space and/or bit-depth to a second color space and/or bit-depth according to an embodiment.

FIG. 3 is a flow diagram that depicts a process 300 of using color space transformation techniques to transform or map pixel parameters from a first color space and/or bit-depth to a second color space and/or bit-depth, according to an embodiment. In various aspects, the flow diagram depicted in FIG. 3 represents at least a portion of the video processing instructions 104. For example, the process 300 can operate to transform portions of a video content item embodied as a Rec. 709/8-bit format to a Rec. 2020/10 or 12-bit format. The process 300 of one embodiment transforms ROI pixels from a first color space and/or bit-depth to a second color space and/or bit-depth. ROI pixels and/or non-ROI pixels may be identified according to different identification techniques. Identification techniques include, but are not limited to, user focus determinations, motion or motion vector determinations, object types and/or locations, human vision constraints, etc. For example, pixels can be designated as non-ROI pixels from regions of a content item that a user is unlikely to be focused on and/or due to limitations of the eye (e.g., difficulty of reactive cone sets to focus on blue, green and red, blue-violet, etc.).

It will be appreciated that the process 300 can enable an efficient use of processing and memory resources by limiting the color and/or bit-depth transformations to ROI pixels. In one embodiment, the process 300 can analyze a video content item to determine which part of each frame the user is likely focused on. For example, a user focus may be directed at motion within a scene, a main character, a singer, frame to frame object changes, etc. Each ROI may correspond to a block of pixels (8×8, 16×16, 32×32, etc.) or a blob of pixels having varying dimensions and/or characteristics. For example, a blob of pixels may have an irregular shape or a defined geometric shape. A blob of pixels can be further broken down into pixel blocks or other configurations.

At 302, the process 300 begins by receiving a request for video content. For example, a user may have used an electronic program guide to select a live event (linear content), a video on demand item (non-linear content), or a digital video recording (non-linear content) to watch. At 304, the process 300 determines if a display device 108 is capable of enhanced display capabilities, such as enhanced color space and/or bit-depth capabilities for example. For example, when setting up viewing preferences, a user may be queried with an on-screen message to identify a device type and/or display capabilities. As another example, an HDMI or other component may be used to automatically identify display capabilities. If the display device 108 is not capable of enhanced display capabilities, the process 300 at 306 provides the video content having display parameters that correspond with a first color space (e.g., Rec. 709) and/or first bit-depth (e.g., 8 bits).

If the display device 108 is capable of enhanced display capabilities, the process 300 at 308 determines if the video content is linear or non-linear content. If the video content is linear content, the process 300 at 310 applies a linear content transform method to provide the video content having display parameters that correspond with a second color space (e.g., Rec. 2020) and/or second bit-depth (e.g., 10 bits) and returns to 302. If the video content is non-linear content, the process 300 at 312 applies a non-linear content transform method to provide the video content having display parameters that correspond with the second color space (e.g., Rec. 2020) and/or second bit-depth (e.g., 10 bits) and returns to 302. A layering or overlay process can be used to integrate ROI pixels and non-ROI pixels of each associated video frame. For example, after transforming a frame of ROI pixels into a new color space and/or bit-depth, non-ROI pixels can be associated with a first frame layer and ROI pixels can be associated with a second frame layer. The frame layers can be integrated to generate a modified frame for the video content. As described above, processing and memory resource usage can be reduced by limiting color and/or bit-depth transformation to ROI pixels.

Figure 4A:
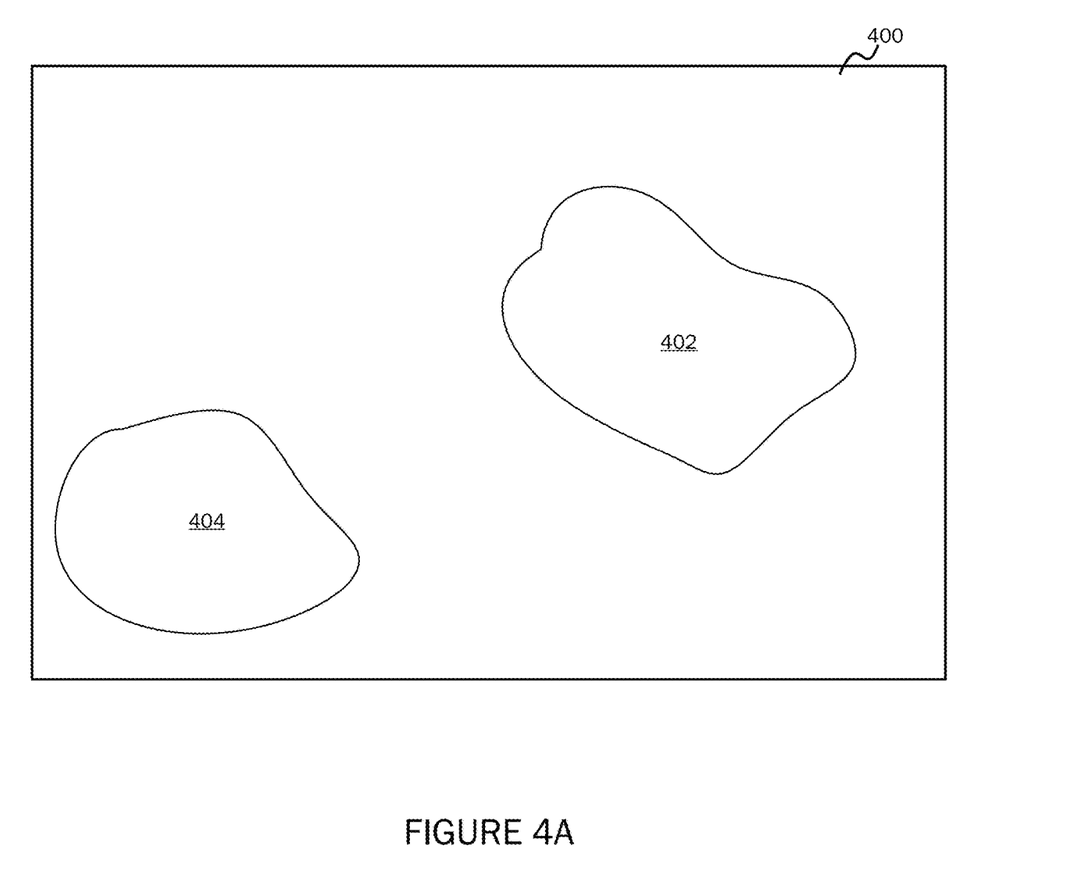
FIG. 4A depicts an example HD frame that includes 1920×1080 pixels.

FIG. 4A depicts an example HD frame 400 that includes 1920×1080 pixels. As shown, a first ROI 402 and a second ROI 404 have been identified as part of transforming portions of a video content item to a UHD color space and bit-depth. For this example, ROI 402 and ROI 404 are represented as irregular groupings or blobs of ROI pixels. According to an embodiment, an irregular grouping of ROI pixels can be further broken down into blocks of ROI pixels for processing block by block. Moreover, more than one ROI may be grouped into one or more larger ROIs. In some cases, a proximity, location, pixel parameters, etc. of one ROI as compared with another ROI can be used to combine initially designated non-ROI pixels as part of a new or existing ROI or exclude initially identified ROI pixels from an ROI (i.e., designate as non-ROI pixels). ROIs may also be prioritized for transforming. For example, an ROI having pixels that are more readily detected by a human eye may be prioritized for processing before an ROI having pixels that are more difficult to detect by a human eye.

Figure 4B:
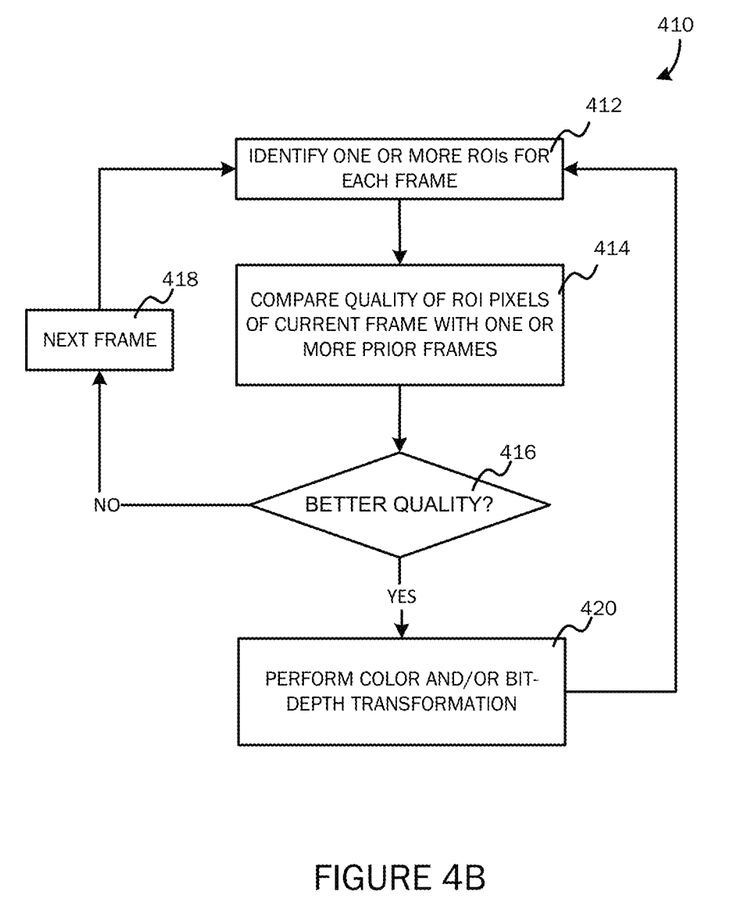
FIG. 4B is a flow diagram that depicts a process of transforming a video content item to an enhanced color space and bit-depth.

FIG. 4B is a flow diagram that depicts a process 410 of transforming a video content item to an enhanced color space and bit-depth, such as an UHD format for example. In various aspects, the flow diagram depicted in FIG. 4B represents at least a portion of the video processing instructions 104. The process 410 of one embodiment uses an ROI analysis to identify ROI pixels and/or non-ROI pixels of one or more of the frames as part of transforming from the HD format to the UHD format. As described above, each ROI may be identified according various identification techniques. Each ROI of an embodiment includes one or more pixel blocks (8×8, 16×16, 32×32, etc.) or a blob of pixels having varying dimensions and/or characteristics. As described above, one or more ROIs or ROI pixels can be further grouped, segregated, re-designated, etc. as part of providing a color transformation.

At 412, the process 410 begins by identifying one or more ROIs (e.g., ROI 402 and/or ROI 404) of a video frame (e.g., frame 400) associated with a video content item, such as a non-linear content item for example. As one implementation example, a consumer having a device with UHD display capability may request a video content item from an on-demand catalog or begin playback of a recorded video content item. Depending on the location (e.g., cloud, local DVR, cloud-based DVR, etc.) of the video content item, the transformation processing operations can be executed on the client-side, back-end, and/or distributed between client-side and back-end components (e.g., chips or chipsets). Moreover, once UHD capable equipment is identified, process 410 can preprocess saved video content items to transform to an enhanced color space and/or bit-depth before a user requests a video content item.

At 414, the process 410 compares a quality of each ROI pixel or average ROI pixel quality of each identified ROI of the current frame with a quality of each ROI pixel or average ROI pixel quality of each identified ROI of one or more prior frames. For example, the quality can be based on a signal-to-noise ratio (SNR) as the relative magnitude of a signal compared to the uncertainty in the signal on a per-ROI pixel or ROI basis. SNR can be calculated as the ratio of a measured signal to an overall measured noise (e.g., current frame to prior frame) for an associated ROI-pixel or ROI. If the process 410 determines that the quality of each ROI pixel or ROI of the current frame is less than or equal to the quality of each ROI pixel or ROI of a prior frame at 416, process 410 proceeds to process the next frame of the video content item at 418. If the process 410 determines that the quality of each ROI pixel or ROI of the current frame is greater than the quality of each ROI pixel or ROI of a prior frame at 416, process 410 proceeds to 420 to perform a color and/or bit-depth transformation for each ROI pixel or ROI.

According to one embodiment, the process 410 at 420 uses a linear prediction algorithm based on least mean square error (LSME) calculations of one or more prior ROI pixels or ROIs to determine prediction coefficients. As described above, prediction coefficients may be provided with video content item metadata for use by user equipment to transform to a new color space (e.g., Rec. 2020). The prediction coefficients can be used as weighting factors to determine how to transform an ROI-pixel from the first color space to the second color space. As one implementation example, referring again to FIG. 2, prediction coefficients have been applied to color values associated with ROI-pixels 206 and 208 to determine locations/color values in the Rec. 2020 color space based on locations/color values in the Rec. 709 color space.

When transforming an ROI-pixel from a first bit-depth (e.g., 8 bits) to a second bit-depth (e.g., 10 bits), the process 410 of an embodiment operates to add values to the additional bits of the second bit-depth based on a location of the ROI-pixel in the first color space. For example, values may be added to the additional bits to transform from a green color region of the first color space to a green color region of the second color space. As part of transforming an ROI-pixel from a first bit-depth to a second bit-depth, the process 410 of one embodiment identifies a mean intensity value for each color of an ROI or an N×N block (8×8, 16×16, 32×32, etc.) encompassing an ROI pixel. Once the mean intensity value for each color is determined, the number of the first bit-depth (8-bit representation) can be multiplied by a factor that accounts for the mean intensity value. For example, the factor can be represented as:

2×(mean value/256) where the mean value is the mean intensity for the block or ROI.

As an example, assume that an ROI has a mean intensity of 150. The factor would be calculated as 2×(150/256)=1.17. The factor of 1.17 would then be multiplied by 256 to equal 300 for the 10-bit representation. As another example, assume that an ROI has a mean intensity of 222. The factor would be calculated as 2×(222/256)=1.78. The factor of 1.78 would then be multiplied by 256 to equal 394 for the 10-bit representation.

Figure 5:
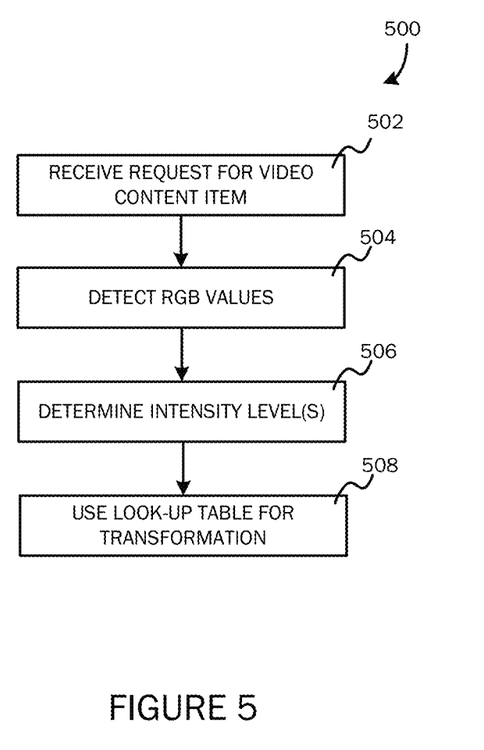
FIG. 5 is a flow diagram that depicts a process of using a look-up table to transform a content item to an enhanced color space and/or bit-depth according to an embodiment.

FIG. 5 is a flow diagram that depicts a process 500 of using a look-up table to transform a content item from an enhanced color space and/or bit-depth according to an embodiment. At 502, the process 500 begins upon receiving a request for a video content item. For example, a consumer having a device with UHD display capability may, via a connected STB, switch to a channel to view a scheduled program. At 504, the process 500 detects RGB values for each frame of the video content item. At 506, the process 500 determines an intensity level or value of one or more pixel blocks (8×8, 16×16, 32×32, etc.) encompassing an ROI pixel for each frame of the video content item. At 508, the process 500 uses the look-up table to map each pixel value from a first color space to a second color space and the intensity levels to convert from a first bit-depth to a second bit-depth for each frame of the video content item. For example, the process 500 can use the look-up table to convert a video content item from an HD format to an UHD format. It will be appreciated that the look-up table parameters may be stored and/or accessed via client and/or server side components.

Figure 6:
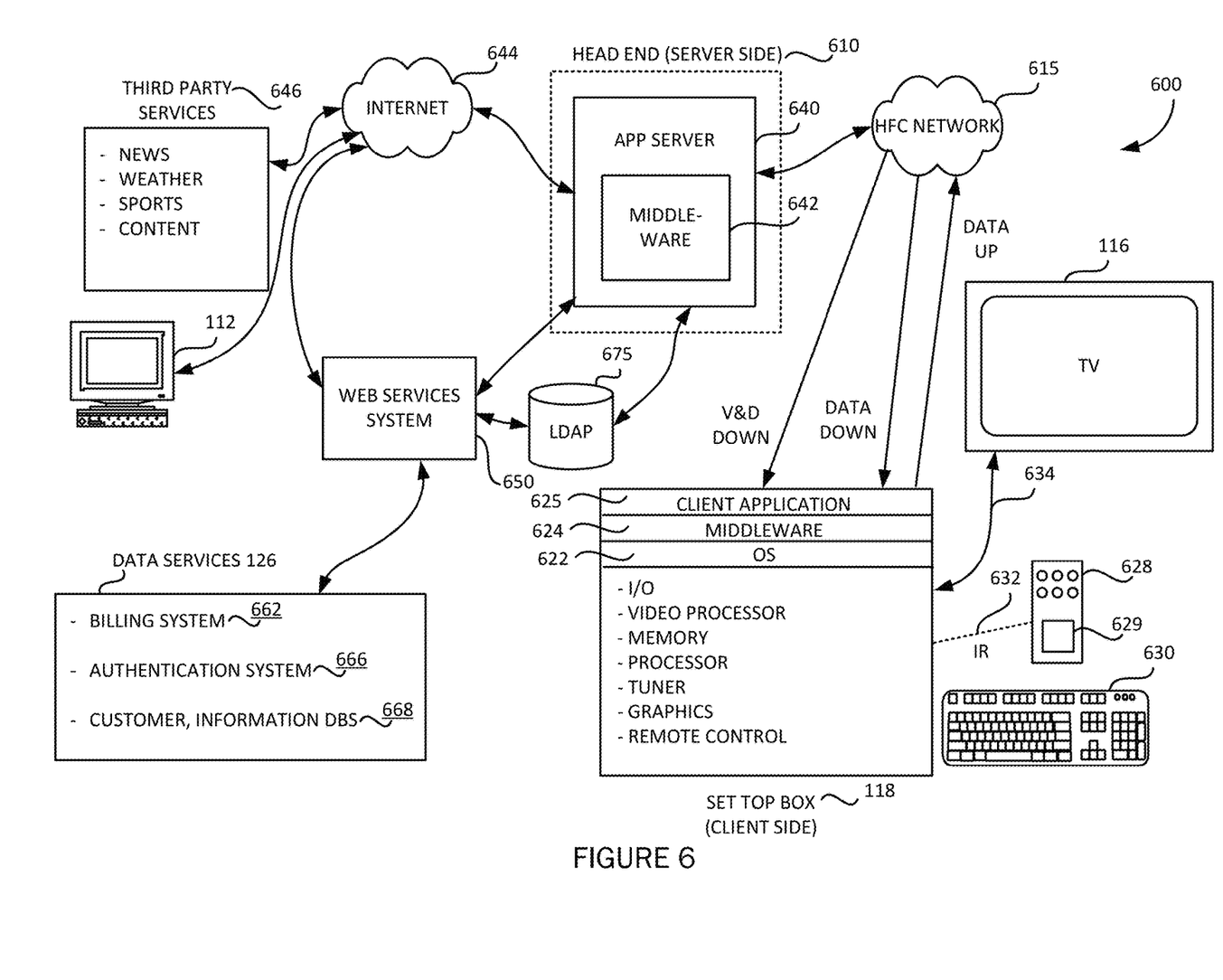
FIG. 6 is a block diagram illustrating a cable television services system architecture providing an operating environment according to an embodiment.

FIG. 6 is a block diagram illustrating a cable television services system 600 (hereafter referred to as "CATV") architecture providing an operating environment according to an embodiment. As should be appreciated, a CATV services system 600 is but one of various types of systems that may be utilized for providing an operating environment for embodiments described herein. Referring now to FIG. 6, digital and analog video programming, information content and interactive television services are provided via a hybrid fiber coax (HFC) network 615 to a television set 116 for consumption by a cable television/services system customer. As is known to those skilled in the art, HFC networks 615 combine both optical fiber and coaxial cable lines. Typically, optical fiber runs from the cable head end 610 to neighborhoods of subscribers. Coaxial cable runs from the optical fiber feeders to each customer or subscriber. The functionality of the HFC network 615 allows for efficient bidirectional data flow between the STB 118 (STB) and the application server 640 of the embodiment.

The CATV system 600 is in the form of a distributed client-server computing system for providing video and data flow across the HFC network 615 between server-side services providers (e.g., cable television/services providers) via a server-side head end 610 and a client-side customer via a STB 118 functionally connected to a customer receiving device, such as the television set 116. As described above, STB 118 can include DVR functionality including one or more hard disk drives. As is understood by those skilled in the art, modern CATV systems 600 may provide a variety of services across the HFC network 615 including traditional digital and analog video programming, telephone services, high speed Internet access, video-on-demand, and services.

On the client side of the CATV system 600, digital and analog video programming and digital and analog data are provided to the customer television set 116 via the STB 118. Interactive television services that allow a customer to input data to the CATV system 600 likewise are provided by the STB 118. As illustrated in FIG. 6, the STB 118 is a multipurpose computing device having a computer processor, memory, and an input/output mechanism. The input/output mechanism receives input from server-side processes via the HFC network 615 and from customers via input devices such as the remote control device 628, keyboard 630, or other computing device 112, such as a tablet/slate computer 114, smartphone 110, etc. The remote control device 628 and the keyboard 630 may communicate with the STB 118 via a suitable communication transport such as the infrared connection 632. The remote control device 628 may include a biometric input module 629. The STB 118 also includes a video processor for processing and providing digital and analog video signaling to the television set 116 via a cable communication transport 634. A multi-channel tuner is provided for processing video and data to and from the STB 118 and the server-side head end system 610, described below. The STB 118 also includes an operating system 622 for directing the functions of the STB 118 in conjunction with a variety of client applications 625. For example, client 106 may generate a signal for STB 118 regarding a recording conflict.

Because a variety of different operating systems 622 may be utilized by a variety of different brands and types of set-top boxes, a middleware layer 624 may be provided to allow a given software application to be executed by a variety of different operating systems. According to an embodiment, the middleware layer 624 may include a set of application programming interfaces (APIs) that are exposed to client applications and operating systems 622 that allow client applications to communicate with the operating systems through common data calls understood via the API set. As described below, a corresponding middleware layer is included on the server side of the CATV system 600 for facilitating communication between the server-side application server and the client-side STB 118. The middleware layer 642 of the server-side application server and the middleware layer 624 of the client-side STB 118 may format data passed between the client side and server side according to the Extensible Markup Language (XML).

According to one embodiment, the STB 118 passes digital and analog video and data signaling to the television 116 via a one-way communication transport 634. According to other embodiments, two-way communication transports may be utilized, for example, via high definition multimedia (HDMI) ports. The STB 118 may receive video and data from the server side of the CATV system 600 via the HFC network 615 through a video/data downlink and data via a data downlink. The STB 118 may transmit data from the client-side of the CATV system 600 to the server-side of the CATV system 600 via the HFC network 615 via one data uplink. The video/data downlink is an "in band" downlink that allows for digital and analog video and data signaling from the server side of the CATV system 600 through the HFC network 615 to the STB 118 for use by the STB 118 and for distribution to the television set 116. The "in band" signaling space operates at a relative high frequency, e.g., between 54 and 1000 megahertz and the signaling space is generally divided into 6 megahertz channels which may be transmitted as a single analog signal or a greater number (e.g., ten) of digital signals.

The data downlink and the data uplink, illustrated in FIG. 6, between the HFC network 615 and the STB 118 comprise "out of band" data links. As is understand by those skilled in the art, the "out of band" frequency range is generally at a lower frequency than "in band" signaling. For example, the "out of band" frequency range may be between zero and 54 megahertz. Data flow between the STB 118 and the server-side application server 640 is typically passed through the "out of band" data links. Alternatively, an "in band" data carousel may be positioned in an "in band" channel into which a data feed may be processed from the application server 640 through the HFC network 615 to the STB 118. Operation of data transport between components of the CATV system 600, described with reference to FIG. 6, is well known to those skilled in the art.

The head end 610 of the CATV system 600 is positioned on the server-side of the CATV system and includes hardware and software systems responsible for originating and managing content for distributing through the HFC network 615 to client-side STBs for presentation to customers. As described above, a number of services may be provided by the CATV system 600, including digital and analog video programming, interactive television services, telephone services, video-on-demand services, targeted advertising, and/or automated color and/or bit-depth transformation functionality.

The application server 640 can be configured as a computing system operative to assemble and manage data sent to and received from the STB 118 via the HFC network 615. As described above, the application server 640 includes a middleware layer 642 for processing and preparing data from the head end of the CATV system 600 for receipt and use by the client-side STB 118. For example, the application server 640 via the middleware layer 642 may obtain content items from third-party services 646 via the Internet 644 for transmitting to a customer through the HFC network 615, the STB 118, and/or recording by a local DVR 101 or remote DVR 102. For example, content metadata a third-party content provider service may be downloaded by the application server via the Internet 644. When the application server 640 receives the downloaded content metadata, the middleware layer 642 may be utilized to format the content metadata for receipt and use by the STB 118. Therefore, content metadata may be sent and categorized based on the availability to the customer's program guide data.

According to one embodiment, data obtained and managed by the middleware layer 642 of the application server 640 is formatted according to the Extensible Markup Language and is passed to the STB 118 through the HFC network 615 where the XML-formatted data may be utilized by a client application 625 in concert with the middleware layer 624, as described above. As should be appreciated by those skilled in the art, a variety of content may be obtained by the application server 640 via distributed computing environments such as the Internet 644 for provision to customers via the HFC network 615 and the STB 118. According to embodiments, client application 640 may include the client 106 described herein.

The data services 126 include a number of services operated by the services provider of the CATV system 600 which may include profile and other data associated with a given customer. A billing system 662 may include information such as a customer's name, street address, business identification number, Social Security number, credit history, and information regarding services and products subscribed to by the customer. According to embodiments, the billing system 662 may also include billing data for services and products subscribed to by the customer for bill processing, billing presentment and payment receipt.

A customer information database 668 may include general information about customers such as place of employment, business address, business telephone number, and demographic information such as age, gender, educational level, and the like. The customer information database 668 may also include information on pending work orders for services or products ordered by the customer. The customer information database 668 may also include device information and/or other information used to provide transformation operations. As should be understood, this information may be stored in a variety of disparate databases operated by the cable services provider.

Web services system 650 is illustrated between the application server 640 and the data services 126. According to embodiments, web services system 650 serves as a collection point for data requested from each of the disparate data services systems comprising the data services 126. According to embodiments, when the application server 640 requires customer services data from one or more of the data services 126, the application server 640 passes a data query to the web services system 650. The web services system formulates a data query to each of the available data services systems for obtaining any required data for a requesting customer as identified by a set-top box or other identification associated with the customer.

The web services system 650 serves as an abstraction layer between the various data services systems and the application server 640. That is, the application server 640 is not required to communicate with the disparate data services systems, nor is the application server 640 required to understand the data structures or data types utilized by the disparate data services systems. The web services system 650 is operative to communicate with each of the disparate data services systems for obtaining necessary customer data. The customer data obtained by the web services system is assembled and is returned to the application server 640 for ultimate processing via the middleware layer 642, as described above. An authentication system 666 may include information such as secure user names, subscriber profiles, subscriber IDs, and passwords utilized by customers for access to network services. As should be understood by those skilled in the art, the disparate systems 650, 662, 666, 668 may be integrated or provided in any combination of separate systems, wherein FIG. 6 shows only one example.

Figure 7:
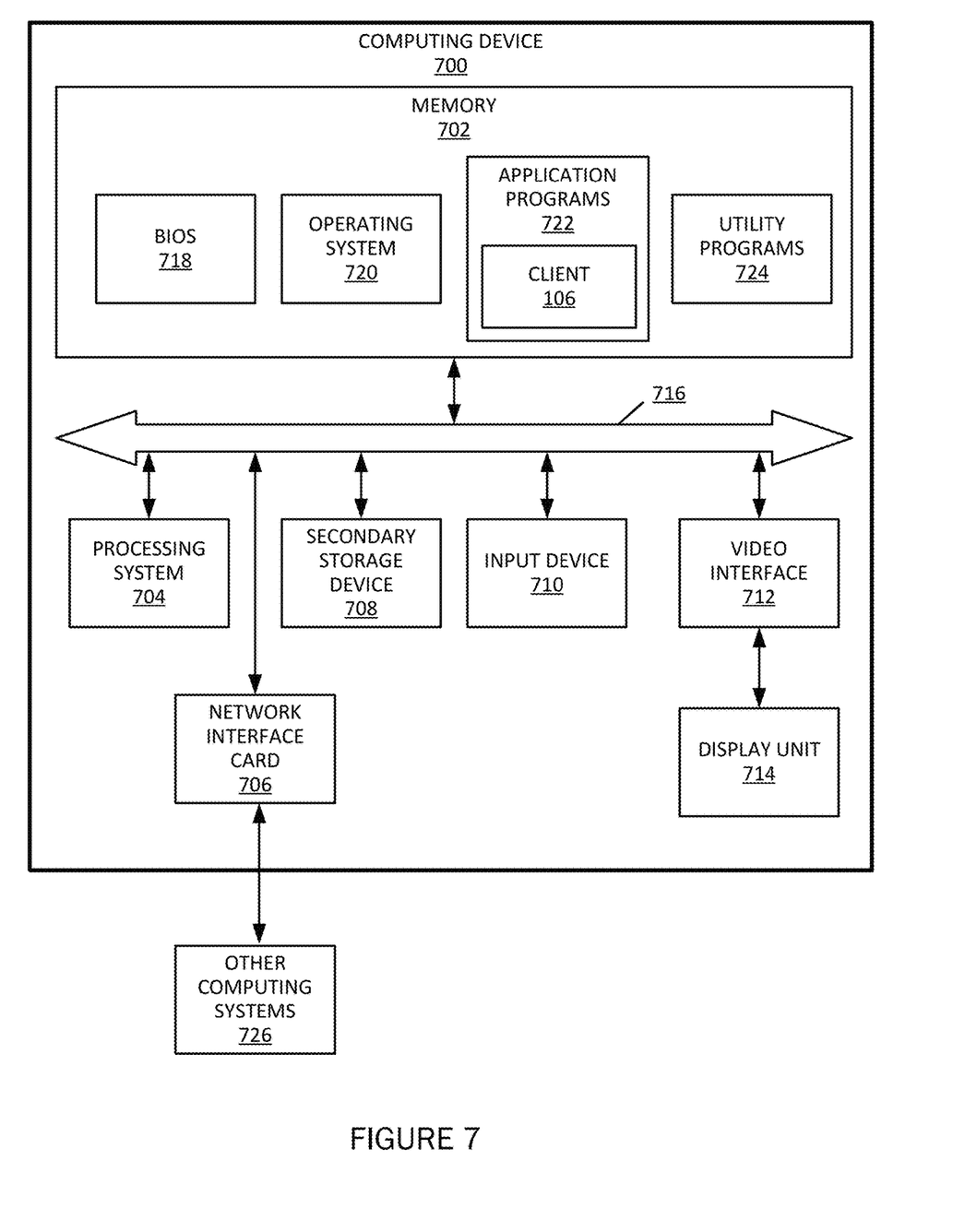
FIG. 7 is a block diagram illustrating example physical components of a computing device with which embodiments may be practiced.

FIG. 7 is a block diagram illustrating example physical components of a computing device 700 with which embodiments may be practiced. In some embodiments, one or a combination of the components of system 100 may be implemented using one or more computing devices like the computing device 700. It should be appreciated that in other embodiments, components of system 100 may be implemented using computing devices having hardware components other than those illustrated in the example of FIG. 7.

Computing devices may be implemented in different ways in different embodiments. For instance, in the example of FIG. 7, the computing device 700 includes a processing system 704, memory 702, a network interface 706, a secondary storage device 708, an input device 710, a video interface 712, a display unit 714, and a communication medium 716. In other embodiments, the computing device 700 may be implemented using more or fewer hardware components (e.g., a video interface, a display unit, or an input device) or in combination with other types of computer systems and program modules 726.

The memory 702 includes one or more computer-readable storage media capable of storing data and/or computer-executable instructions. According to one embodiment, client 106 may be stored locally on computing device 700. Memory 702 thus may store the computer-executable instructions that, when executed by processor 704, cause client 106 to request and/or perform a color space and/or bit-depth transformation, as described above.

In various embodiments, the memory 702 is implemented in various ways. For example, the memory 702 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 704 includes one or more processing units, which may include tangible integrated circuits that selectively execute computer-executable instructions. In various embodiments, the processing units in the processing system 704 are implemented in various ways. For example, the processing units in the processing system 704 can be implemented as one or more processing cores. In this example, the processing system 704 can comprise one or more microprocessors. In another example, the processing system 704 can comprise one or more separate microprocessors. In yet another example embodiment, the processing system 704 can comprise Application-Specific Integrated Circuits (ASICs) that provide specific functionality. In yet another example, the processing system 704 provides specific functionality by using an ASIC and by executing computer-executable instructions.

The computing device 700 may be enabled to send data to and receive data from a communication network via a network interface card 706. In different embodiments, the network interface card 706 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 708 includes one or more computer-readable storage media, and may store data and computer-executable instructions not directly accessible by the processing system 704. That is, the processing system 704 performs an I/O operation to retrieve data and/or computer-executable instructions from the secondary storage device 708. In various embodiments, the secondary storage device 708 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 710 enables the computing device 700 to receive input from a user. Example types of input devices include, but are not limited to, keyboards, mice, trackballs, stylus input devices, key pads, microphones, joysticks, touch-sensitive display screens, and other types of devices that provide user input to the computing device 700.

The video interface 712 outputs video information to the display unit 714. In different embodiments, the video interface 712 is implemented in different ways. For example, the video interface 712 is a video expansion card. In another example, the video interface 712 is integrated into a motherboard of the computing device 700. In various embodiments, the display unit 714 can be a an LCD display panel, a touch-sensitive display panel, an LED screen, a projector, a cathode-ray tube display, or another type of display unit. In various embodiments, the video interface 712 communicates with the display unit 714 in various ways. For example, the video interface 712 can communicate with the display unit 714 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 716 facilitates communication among the hardware components of the computing device 700. In different embodiments, the communications medium 716 facilitates communication among different components of the computing device 700. For instance, in the example of FIG. 7, the communications medium 716 facilitates communication among the memory 702, the processing system 704, the network interface card 706, the secondary storage device 708, the input device 710, and the video interface 712. In different embodiments, the communications medium 716 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718, and an operating system 720. The BIOS 718 includes a set of software instructions that, when executed by the processing system 704, cause the computing device 700 to boot up. The operating system 720 includes a set of software instructions that, when executed by the processing system 704, cause the computing device 700 to provide an operating system that coordinates the activities and sharing of resources of the computing device 700. The memory 702 also stores one or more application programs 722 that, when executed by the processing system 704, cause the computing device 700 to provide applications to users, for example, the client 106. The memory 702 also stores one or more utility programs 724 that, when executed by the processing system 704, cause the computing device 700 to provide utilities to other software programs.

Figure 8A:
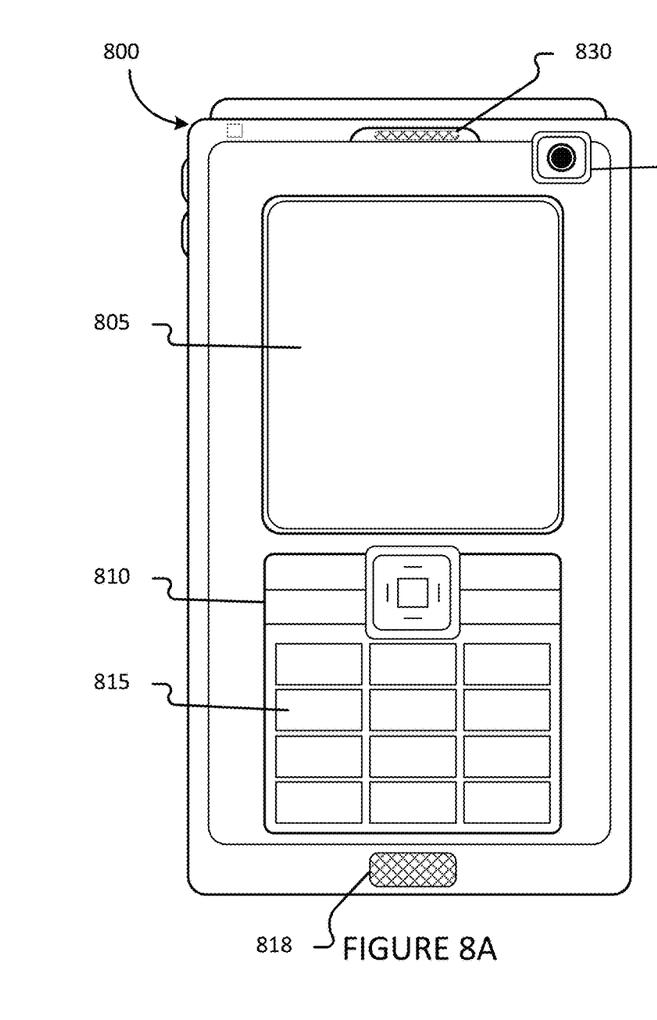
FIGS. 8A-8B illustrate a suitable mobile computing environment with which embodiments may be practiced.
Figure 8B:
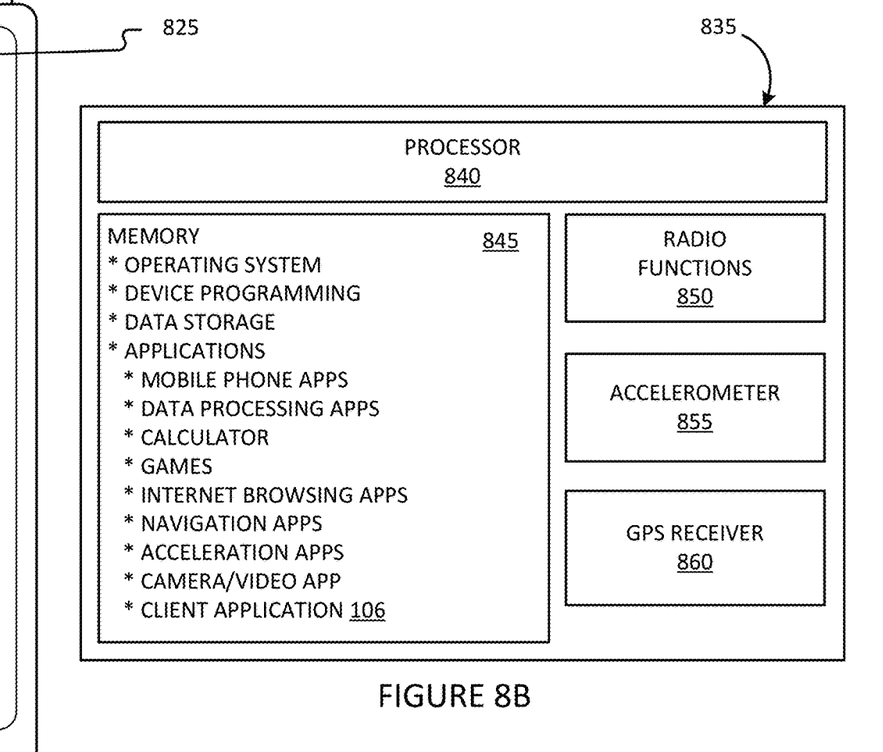

FIGS. 8A-8B illustrate a suitable mobile computing environment, for example, a mobile computing device or smartphone 110, a tablet personal computer 114, a laptop computer 112, and the like, with which embodiments may be practiced. The mobile computing device 800 is illustrative of any suitable device operative to send, receive and process wireless communications. A display screen 805 is operative for displaying a variety of information such as information about incoming and outgoing communications, as well as, a variety of data and displayable objects, for example, text, alphanumeric data, photographs, and the like.

Data input to the device 800 may be performed via a variety of suitable means, such as, touch screen input via the display screen 805, keyboard or keypad input via a data entry area 810, key input via one or more selectable buttons or controls 815, voice input via a microphone 818 disposed on the device 800, photographic input via a camera 825 functionality associated with the device 800, or any other suitable input means. Data may be output via the device 800 via any suitable output means, including but not limited to, display on the display screen 805, audible output via an associated speaker 830 or connected earphone system, vibration module for providing tactile output, and the like.

Referring now to FIG. 8B, operational unit 835 is illustrative of internal operating functionality of the mobile computing device 800. A processor 840 is illustrative of a computer processor for processing incoming and outgoing data and communications and controlling operation of the device and associated software applications via a mobile computing device operating system. Memory 845 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, client 106 may be stored locally on mobile computing device 800.

Mobile computing device 800 may contain an accelerometer 855 for detecting acceleration, and can be used to sense orientation, vibration, and/or shock. Mobile computing device 800 may contain a global positioning system (GPS) system (e.g., GPS send/receive functionality) 860. A GPS system 860 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 850 include all required functionality, including onboard antennae, for allowing the device 800 to communicate with other communication devices and systems via a wireless network. Radio functions 850 may be utilized to communicate with a wireless or WIFI-based positioning system to determine a device location.

Although described herein in combination with mobile computing device 800, in alternative embodiments aspects may be used in combination with any number of computer systems, such as in desktop environments, laptop or notebook computer systems, multiprocessor systems, microprocessor based or programmable consumer electronics, networked PCs, mini computers, main frame computers and the like. Embodiments may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data may also be stored on or read from other types of computer-readable storage media. Further, the disclosed processes may be modified in any manner, including by reordering and/or inserting or deleting a step or process, without departing from the embodiments.

The foregoing description has been presented for the purposes of illustration and description. It is not intended to be exhaustive or to limit the embodiments to the precise forms disclosed. Many modifications and variations are possible in light of the above teaching. It is intended that the scope of the invention be limited not with this detailed description, but rather by the claims appended hereto.

We claim:

1. A system comprising:
   a display device that includes ultra high-definition (UHD) capabilities; and
   a video processor that includes a video processing algorithm to transform video content of a first type or a second type from a first color space and a first bit-depth comprising a high definition (HD) format to a second color space and a second bit-depth comprising a UHD format, wherein the video processing algorithm:
      receives the video content of the first type or the second type in the HD format;
      identifies one or more region of interest (ROI) pixels of a current frame and one or more ROI pixels of one or more prior frames of the video content in the HD format;
      compares a pixel quality comprising a signal-to-noise ratio (SNR) of one or more of the identified ROI pixels of the current frame with a pixel quality comprising an SNR of one or more of the identified ROI pixels of the one or more prior frames of the video content in the HD format;

for linear content as the first type of video content in the HD format:
   determines that the one or more identified ROI pixels of the current frame have the SNR that is greater than the SNR of the one or more of the identified ROI pixels of the one or more prior frames;
   uses a look-up table to transform one or more of the identified ROI pixels of the current frame from the first color space and the first bit-depth comprising the HD format to the second color space and the second bit-depth comprising the UHD format;
   processes a next frame of the video content when the one or more identified ROI pixels of the current frame have the SNR that is less than or equal to the SNR of the one or more of the identified ROI pixels of the one or more prior frames;
   identifies one or ROI pixels of the next frame;
   determines that one or more identified ROI pixels of the next frame have an SNR that is greater than the SNR of the one or more of the identified ROI pixels of the one or more prior frames; and
   uses the look-up table to transform one or more of the identified ROI pixels of the next frame from the first color space and the first bit-depth comprising the HD format to the second color space and the second bit-depth comprising the UHD format; and
for non-linear content as the second type of video content in the HD format:
   determines the one or more identified ROI pixels of the current frame have the SNR that is greater than the SNR of the one or more of the identified ROI pixels of the one or more prior frames;
   uses a prediction method to generate prediction coefficients to transform one or more of the identified ROI pixels of the current frame from the first color space and the first bit-depth comprising the HD format to the second color space and the second bit-depth comprising the UHD format;
   processes a next frame of the video content when the one or more identified ROI pixels of the current frame have the SNR that is less than or equal to the SNR of the one or more of the identified ROI pixels of the one or more prior frames;
   identifies one or ROI pixels of the next frame;
   determines that one or more identified ROI pixels of the next frame have an SNR that is greater than the SNR of the one or more of the identified ROI pixels of the one or more prior frames; and
   uses the prediction method to generate prediction coefficients to transform one or more of the identified ROI pixels of the next frame from the first color space and the first bit-depth comprising the HD format to the second color space and the second bit-depth comprising the UHD format.

2. The system of claim 1, wherein a signal is received prior to using the video processing algorithm, via a network, to convey UHD capability and invoke use of the video processing algorithm.

3. The system of claim 2, wherein the video content of the second type comprises one of a video on demand content item or a recorded video content item.

4. The system of claim 2, wherein the video content of the first type comprises a linear video content item.

5. The system of claim 1, wherein a signal is received prior to using the look-up table, via a network, to convey UHD capability and invoke use of the look-up table.

6. The system of claim 1, wherein the prediction coefficients are provided with metadata of the video content.

7. The system of claim 1, wherein the video processing algorithm analyzes each frame of the video content to identify one or more region of interests (ROIs) for each frame.

8. The system of claim 7, wherein each ROI or ROI pixel is based in part on user focus determinations.

9. The system of claim 1, wherein the video processing algorithm identifies ROI portions and non-ROI portions.

10. The system of claim 9, wherein the video processing algorithm limits a transformation from the first color space and the first bit-depth to the second color space and the second bit-depth to the ROI portions.

11. The system of claim 1, wherein the video processing algorithm uses a least mean square error (LSME) to determine the prediction coefficients.

12. The system of claim 1, wherein the video processing algorithm uses an intensity determination to transform from the first bit-depth to the second bit-depth.

13. The system of claim 1, wherein the video processing algorithm is included with a video processor chip or chipset.

14. A method comprising:
   receiving a request for video content for display on a display device that includes UHD capabilities; and
   using a video processor that includes a video processing algorithm to transform the video content of a first type or a second type from a first color space and a first bit-depth comprising an HD format to a second color space and a second bit-depth comprising a UHD format, wherein the video processing algorithm:
      receives the video content of the first type or the second type in the HD format;
      identifies one or more ROI pixels of a current frame and one or more ROI pixels of one or more prior frames of the video content in the HD format;
      compares a pixel quality comprising an SNR of one or more of the identified ROI pixels of the current frame with a pixel quality comprising an SNR of one or more of the identified ROI pixels of the one or more prior frames of the video content in the HD format;
      for linear content as the first type of video content in the HD format:
         determines that the one or more identified ROI pixels of the current frame have the SNR that is greater than the SNR of the one or more of the identified ROI pixels of the one or more prior frames;
         uses a look-up table to transform one or more of the identified ROI pixels of the current frame from the first color space and the first bit-depth comprising the HD format to the second color space and the second bit-depth comprising the UHD format;
         processes a next frame of the video content when the one or more identified ROI pixels of the current frame have the SNR that is less than or equal to the SNR of the one or more of the identified ROI pixels of the one or more prior frames;
         identifies one or ROI pixels of the next frame;
         determines that one or more identified ROI pixels of the next frame have an SNR that is greater than the SNR of the one or more of the identified ROI pixels of the one or more prior frames; and
         uses the look-up table to transform one or more of the identified ROI pixels of the next frame from the first color space and the first bit-depth comprising the HD format to the second color space and the second bit-depth comprising the UHD format; and for non-linear content as the second type of video content in the HD format:
   determines the one or more identified ROI pixels of the current frame have the SNR that is greater than the SNR of the one or more of the identified ROI pixels of the one or more prior frames;
   uses a prediction method to generate prediction coefficients to transform one or more of the identified ROI pixels of the current frame from the first color space and the first bit-depth comprising the HD format to the second color space and the second bit-depth comprising the UHD format;
   processes a next frame of the video content when the one or more identified ROI pixels of the current frame have the SNR that is less than or equal to the SNR of the one or more of the identified ROI pixels of the one or more prior frames;
   identifies one or ROI pixels of the next frame;
   determines that one or more identified ROI pixels of the next frame have an SNR that is greater than the SNR of the one or more of the identified ROI pixels of the one or more prior frames; and
   uses the prediction method to generate prediction coefficients to transform one or more of the identified ROI pixels of the next frame from the first color space and the first bit-depth comprising the HD format to the second color space and the second bit-depth comprising the UHD format.

15. The method of claim 14, further comprising using the video processing algorithm to analyze each frame of the video content to identify one or more ROIs for each frame.

16. The method of claim 15, further comprising using the video processing algorithm to determine a signal quality for one or more ROIs of a current frame and a signal quality for one or more ROIs of one or more previous frames.

17. The method of claim 14, wherein the video processing algorithm uses an intensity determination to transform from the first bit-depth to the second bit-depth.

18. A non-transitory computer readable medium including executable instructions which, when executed:
   receive a request for video content for display on a display device that includes UHD capabilities; and
   use a video processor that includes a video processing algorithm to transform the video content of a first type or a second type from a first color space and a first bit-depth comprising an HD format to a second color space and a second bit-depth comprising a UHD format, wherein the video processing algorithm:
   receives the video content of the first type or the second type in the HD format;
   identifies one or more ROI pixels of a current frame and one or more ROI pixels of one or more prior frames of the video content in the HD format;
   compares a pixel quality comprising an SNR of one or more of the identified ROI pixels of the current frame with a pixel quality comprising an SNR of one or more of the identified ROI pixels of the one or more prior frames of the video content in the HD format;

for linear content as the first type of video content in the HD format:
   determines that the one or more identified ROI pixels of the current frame have the SNR that is greater than the SNR of the one or more of the identified ROI pixels of the one or more prior frames;
   uses a look-up table to transform one or more of the identified ROI pixels of the current frame from the first color space and the first bit-depth comprising the HD format to the second color space and the second bit-depth comprising the UHD format;
   processes a next frame of the video content when the one or more identified ROI pixels of the current frame have the SNR that is less than or equal to the SNR of the one or more of the identified ROI pixels of the one or more prior frames;
   identifies one or ROI pixels of the next frame;
   determines that one or more identified ROI pixels of the next frame have an SNR that is greater than the SNR of the one or more of the identified ROI pixels of the one or more prior frames; and
   uses the look-up table to transform one or more of the identified ROI pixels of the next frame from the first color space and the first bit-depth comprising the HD format to the second color space and the second bit-depth comprising the UHD format; and for non-linear content as the second type of video content in the HD format:
   determines the one or more identified ROI pixels of the current frame have the SNR that is greater than the SNR of the one or more of the identified ROI pixels of the one or more prior frames;
   uses a prediction method to generate prediction coefficients to transform one or more of the identified ROI pixels of the current frame from the first color space and the first bit-depth comprising the HD format to the second color space and the second bit-depth comprising the UHD format;
   processes a next frame of the video content when the one or more identified ROI pixels of the current frame have the SNR that is less than or equal to the SNR of the one or more of the identified ROI pixels of the one or more prior frames;
   identifies one or ROI pixels of the next frame;
   determines that one or more identified ROI pixels of the next frame have an SNR that is greater than the SNR of the one or more of the identified ROI pixels of the one or more prior frames; and
   uses the prediction method to generate prediction coefficients to transform one or more of the identified ROI pixels of the next frame from the first color space and the first bit-depth comprising the HD format to the second color space and the second bit-depth comprising the UHD format.

* * * * *